US007039171B2

(12) United States Patent
Gickler

(10) Patent No.: US 7,039,171 B2
(45) Date of Patent: May 2, 2006

(54) METHOD AND SYSTEM FOR CALL TRACKING TO DISCOVER INMATE-EMPLOYEE FRATERNIZATION

(75) Inventor: Christopher L. R. Gickler, Delaware, OH (US)

(73) Assignee: MCI, LLC, Basking Ridge, NJ (US)

( * ) Notice: Subject to any disclaimer, the term of this patent is extended or adjusted under 35 U.S.C. 154(b) by 82 days.

(21) Appl. No.: 10/721,472

(22) Filed: Nov. 26, 2003

(65) Prior Publication Data

US 2004/0114740 A1    Jun. 17, 2004

Related U.S. Application Data

(63) Continuation-in-part of application No. 10/325,839, filed on Dec. 23, 2002.

(60) Provisional application No. 60/342,443, filed on Dec. 24, 2001.

(51) Int. Cl.
*H04M 15/00* (2006.01)
*H04M 3/22* (2006.01)

(52) U.S. Cl. .................. 379/112.01; 379/35; 379/133

(58) Field of Classification Search ........... 379/114.14, 379/93.01, 112.01, 106.02, 88.18, 88.19, 379/88.2, 88.21, 88.23, 88.25, 88.13, 88.08, 379/67.1, 35, 133
See application file for complete search history.

(56) References Cited

U.S. PATENT DOCUMENTS

| | | | |
|---|---|---|---|
| 5,535,261 A * | 7/1996 | Brown et al. | ............ 379/88.11 |
| 6,052,454 A | 4/2000 | Kek et al. | |
| 6,064,963 A | 5/2000 | Gainsboro | |
| 2001/0036821 A1 * | 11/2001 | Gainsboro et al. | .......... 455/410 |
| 2002/0071537 A1 * | 6/2002 | Gainsboro | .................. 379/188 |

OTHER PUBLICATIONS

"TOSS Video Network Management, Inc. Announces New Product TC Reliance Video Visitation Manager 1.0", Press Release, Apr. 23, 2003, http://www.toddvnm.com/pr/042320032.htm.
"Conversational Voice-Access Solutions that Attract and Retain Customers: Correction Facilities", Web for Phone, http://www.webforphone.com/uses/corrections.asp.
"Application Examples", WG Systems, copyright 2001-2003 http://www.wgsystems.com.br/english/dc/wg_applic.exemp_htm#Corrections.
"Networked Multimedia Communication, Telejustice and Security Solutions", Vugate, http://www.vugate.com/index2.htm.
"Quality Turnkey Solutions from Experienced Telecommunication Professionals for All Your Video, Data, Voice, Security, Networking and Wireless LAN, MAN and WAN Applications", Telecom Engineering Consultants, copyright 2002, http://www.tec-inc.com/.
"IVVIS", TEM Systems, Inc., copyright 2003, http://www.temsystems.com/inmate.htm.
"Video Visitation Voice Scheduling", TEM Systems Inc., http://www.temsystems.com/inmate%20voice%20scheduling.htm.

* cited by examiner

*Primary Examiner*—Barry Taylor

(57) ABSTRACT

A method and apparatus for discovery of inmate-employee fraternization includes correlating inmate identification records and employee information data from a plurality of correctional facilities in a central database with call detail records from inmate telephone activities.

27 Claims, 7 Drawing Sheets

METHOD AND SYSTEM FOR CALL TRACKING TO DISCOVER INMATE-EMPLOYEE FRATERNIZATION

RELATED APPLICATION DATA

This application is a continuation-in-part of U.S. patent application Ser. No. 10/325,839 filed Dec. 23, 2002 which itself is based on and claims the benefit of U.S. Provisional Patent Application Ser. No. 60/342,443, filed Dec. 24, 2001, each of which is incorporated herein by reference in its entirety.

FIELD OF THE INVENTION

An exemplary embodiment of the present invention relates, in general, to a method and system for information gathering, sorting and delivery, and in particular to a method and system for monitoring, investigating, correlating, identifying and reporting inmate-employee fraternization based upon telephone call activities between inmates and employees, located in the same or differing correctional facilities, within a Department of Corrections system.

BACKGROUND

In recent years, many correctional facilities have extended liberal telephone privileges to inmates to promote community and family ties that contribute positively to inmates' personal development. In the interest of promoting wholesome family ties, hundreds of thousands of telephone calls are permitted to be made each day by inmates of correctional facilities. Unfortunately, serious abuse of the telephone system has been noted relating, in an exemplary instance, to improper inmate-employee fraternization.

Due to the liberalization of phone privileges (as well as the advent and popularity of computer correspondence) improper fraternization between inmates and employees has become problematic. Such improper fraternization can occur in several ways. For example, improper inmate-employee fraternization can be sexual in nature which can lead to favoritism and discrimination within a correctional facility and within a Department of Corrections (DOC). However, inmate-employee fraternization more likely occurs for purposes of economic gain (e.g., smuggling illegal materials into and out of the correctional facility). The "black market" for drugs and other creature "comforts," not normally available to inmates, can create a large windfall for the employee and the inmate alike. Improper fraternization can occur within a single correctional facility and also between parties located in different correctional facilities within the same system.

Correctional facilities maintain control systems for processing inmate calls. Each time an inmate places a call from a correctional facility, a call detail record (CDR) of the call is created. The call detail records of inmate calls typically include the name of the inmate (and/or inmate identification number), the inmate's location, the number called and the date, time and duration of the call. Inmate call control systems may also include certain call monitoring facilities that enable correctional facility personnel to monitor and record inmate calls.

SUMMARY

Although correctional facilities have call processing platforms for monitoring and recording of inmate calls, and call detail records are maintained, these systems provide little help in effectively monitoring, tracking and correlating the expanding web of inmate fraternization with employees and staff members. Given the limited resources for monitoring calls and the seriousness of the inmate telephone abuse problem, there is a need for a system and method that has the capability of identifying, tracking and correlating the telephone activities and calling patterns between inmates and employees, and in particular, a system that is capable of establishing correlations of inmate calling activities from one correctional institution to all possible employees with the DOC so that monitoring resources can best be utilized and inmate-employee fraternization of various DOC facilities can be tracked and stopped.

In accordance with an exemplary embodiment of the present invention a method of discovering inmate-employee fraternization is disclosed. A plurality of inmate communications are monitored. The plurality of monitored inmate communications are compared to information relating to inmates and employees located in a database. Based at least on the results of the comparing, it is determined if one or more of the plurality of communications indicate that an employee and inmate are fraternizing. A predetermined action is performed if one of the plurality of communications indicates that the employee and inmate are fraternizing.

In accordance with another exemplary embodiment of the present invention a system that discovers employee-inmate fraternization is provided. A monitoring module monitors a plurality of communications from inmates. A comparison module compares the plurality of monitored communications to information in a database. A determination module determines, based at least on the results of the comparison, if one or more of the plurality of communications indicate that an employee and inmate are fraternizing and a result module forwards instructions to perform a predetermined action if one of the plurality of communications indicates that the employee and inmate are fraternizing.

In accordance with yet another exemplary embodiment of the present invention an information storage media is disclosed information configured to determine inmate-employee fraternization comprising information that monitors a plurality of communications from inmates, information that compares the plurality of monitored communications to information in a database, information that enables determination, based at least on the results of the comparing, if one or more of the plurality of communications indicate that an inmate and employee are fraternizing, and information that performs a predetermined action if one of the plurality of communications indicate that an inmate and employee are fraternizing.

BRIEF DESCRIPTION OF THE DRAWINGS

The above and other objects, features, and advantages of the invention will be apparent from the following more particular description of preferred embodiments of the invention, as illustrated in the accompanying drawings in which like reference characters refer to the same parts throughout the different views.

DETAILED DESCRIPTION

An exemplary embodiment of the present invention involves correlation of inmate-employee fraternization activities across institutional boundaries and allows the systematic identification of meetings and/or activities by tracking and monitoring an inmate's telephone activities and comparing these activities to a database of employee information. Although specific embodiments will be illustrated and described herein, it will be appreciated by those of ordinary skill in the art that any arrangement, which is calculated to achieve the same purpose, may be substituted for the specific embodiment shown. This application is intended to cover any adaptations or variations of the present invention that generally relate to systems, methods, and an apparatus for gathering, correlating and determining inmate-employee fraternization from one or more locations.

In the following detailed description of the exemplary embodiments, reference is made to the accompanying drawings that form a part hereof, and in which is shown by way of illustration specific exemplary embodiments in which the invention may be practiced. These embodiments are described in sufficient detail to enable those skilled in the art to practice the invention, and it is to be understood that other embodiments may be utilized and that logical, mechanical and electrical changes may be made without departing from the spirit and scope of the present invention. The following detailed description is, therefore, not to be taken in a limiting sense.

Figure 1:
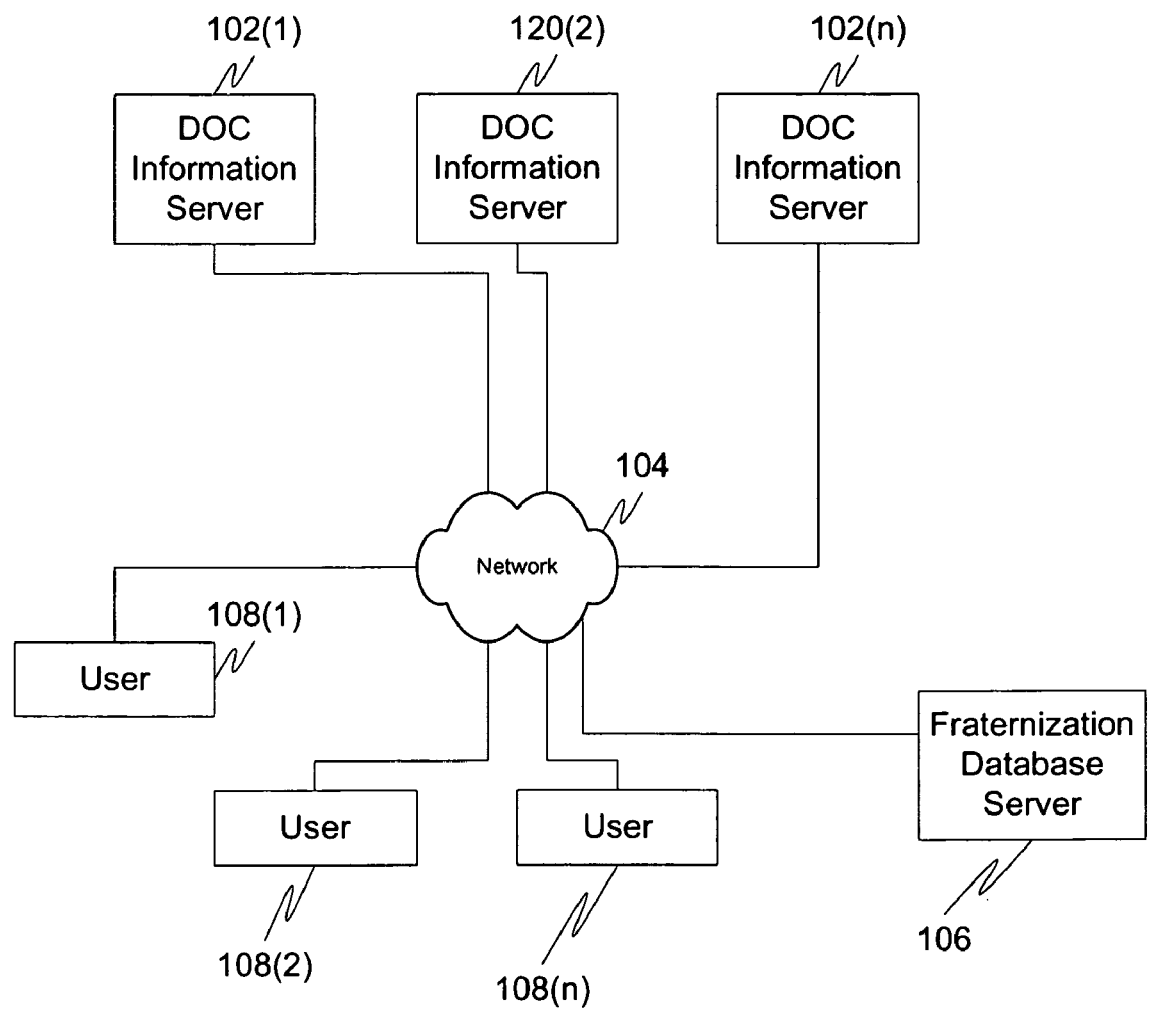
FIG. 1 shows a simplified high level view of one embodiment of a system architecture of the present invention.

FIG. 1 shows a simplified high level view of an exemplary embodiment of a system architecture according to the present invention. DOC facility information servers 102(1), 102(2) to 102(*n*) gather and store information about inmates at correctional facilities. Each information server 102 is linked via a network, such as a private network 104, which may be a frame network, a secure internet link, or the like, to a fraternization database server 106 where information associated with inmates-employees from the various DOC facilities is collected and maintained. The fraternization database server 106 may be accessed by users 108(1) to 108(*n*) via a link, such as a secure link, through the private network 104.

While the exemplary embodiments illustrated herein show the various components collocated, it is to be appreciated that the various components can be located at distant portions of distributed network, such as local area network, a wide area network, a telecommunications network, an intranet and/or the internet or within a dedicated system. Thus, it should be appreciated, that the various components can be combined into one or more devices or collocated on a particular node of a distributed network, such as telecommunications network. As will be appreciated from the following description, and for reasons of computational efficiency, the components can be arranged at any location within a distributed network without affecting the operation of the system.

Furthermore, it should be appreciated that the various links connecting the elements can be wired or wireless links or a combination thereof, or any other known or later developed element(s) that is capable of supplying and/or communicating data to and from the connected elements.

Additionally, it should be appreciated while various functional components are illustrated, various other components, such as switches, routers, long distance carriers, or the like, can also be included without affecting the operation of the system.

Also, while the systems and methods of this invention will be described in relation to a specific embodiment relating to telephone calls, it is to be appreciated that the system can be applied with equal success to other types of communications standards and protocols such as voice-over-packet, voice-over IP (VOIP), voice-over network, wired or wireless communications systems, such as mobile phone communications, PDA communications, or the like. In general, the systems and methods of this invention will work equally well with any communications system or protocol.

Furthermore, while the exemplary embodiments will be described in relation to inmates at a department of corrections, in general the systems and methods of this invention can be used with any demographic in any environment to monitor any type of electronic communication including, but not limited to telephone calls, e-mail, instant messaging, electronic chat, paging or the like.

Additionally, the term module as used herein can be any device, software or combination of hardware and software configured to perform at least one particular function.

Figure 2:
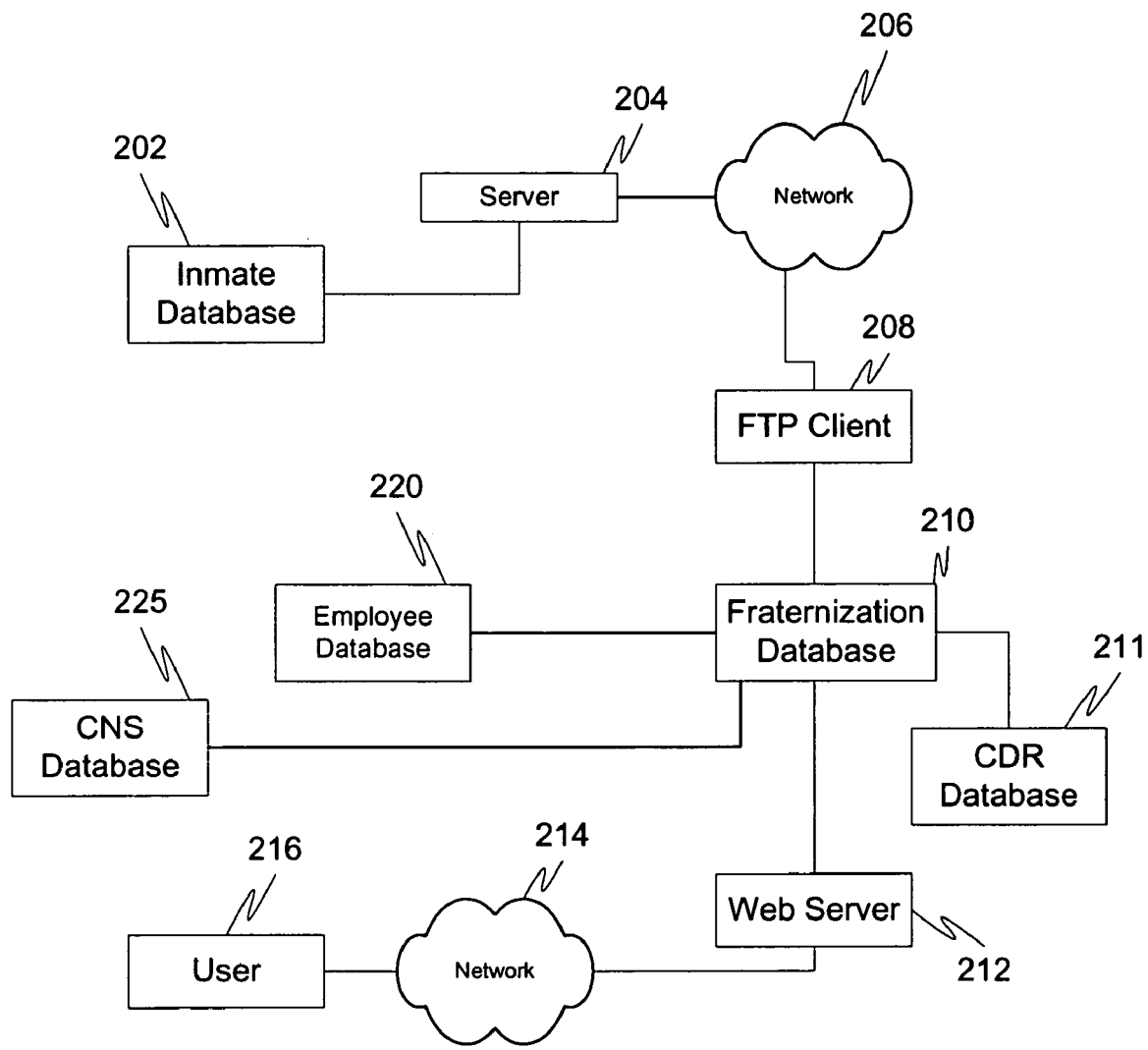
FIG. 2 shows a simplified but more detailed example of the system of FIG. 1.

FIG. 2 shows a simplified but more detailed example of the system of FIG. 1, according to an exemplary embodiment of the invention. This example illustrates a single database system for a single facility within a department of corrections (e.g., the State of Ohio DOC). It should be understood however that any number of state and/or federal DOC facilities with similar databases and systems may be included in a system according to the present invention.

Inmate database 202 includes information about all of the inmates in all DOC facilities within a department of corrections, including information such as inmate Personal Identification Numbers (PIN), housing unit, lock, and the like.

Employee database 220 includes information about all employees and staff of all employees in a facility within a department of corrections. The employee information stored in the employee database may at least include the first and last name of the employee, home phone number, alternate phone number (e.g., cell phone or paging number) and the assigned institution where the employee works. This data can be entered manually as discussed below with respect to FIGS. 5A and 5B as well as being entered via an automated feed from an external source. Again while the present exemplary embodiment is directed to monitoring telephone calls, it should be understood that the system, including the various databases discussed herein could easily be modified to contain information relating to any type of electronic communication including, but not limited to telephone calls, e-mail, instant messaging, electronic chat, paging or the like.

Called number suppression (CNS) database 225 includes a list of employee contact points (e.g., phone numbers, pager numbers, etc). This list comprises "safe harbor" employee contact points. This data, like the data entered into the employee database 220, can be entered manually as well as being entered via an automated feed from an external source. If an inmate contacted a person associated with the employee contact points it would normally cause concern because contact is being made by an inmate to an employee. However, the contact point (e.g., phone numbers) in the CNS database 225 have been predetermined by DOC officials as "approved" contact points. If, for example, an inmate has a relative that is a corrections officer, communication between the two individuals, while technically fraternization, would in most instances, be acceptable. While the possibility still exists that the fraternization occurring between inmates and employees having employee contact points in the call suppression database is improper, the likelihood is much less than when a fraternization instance is detected as described below. The CNS database 225 in accordance with one exemplary embodiment of the invention includes all of the contact points for a single facility within a DOC. Each database can be updated frequently as information concerning inmates changes and inmates move in and out of the correctional facility.

An exemplary embodiment of the present invention establishes a central data warehouse for uploading, storing and organizing information, such as the data in the inmate database 202, which has been obtained from correctional facilities, in any number of locations locally, nationally, or internationally, within the Department of Corrections system. The data can be correlated, compared, retrieved and sorted based on user input or on a predetermined search, sort and correlation criteria. In one example, information from the inmate database 202 is downloaded on a regular basis, for example, every day, to, for example, a file transfer protocol (FTP) server such as the DOCs FTP server 204. The DOCs FTP server 204 transmits the data to a communications provider FTP client 208 via a network 206, such as a private frame relay network. Communications provider FTP Client 208 downloads the data files received from the FTP server 204 and provides the data file to a fraternization database 210 where the data is then combined and updated. While employee database 220 and CNS database 225 are illustrated in FIG. 2 as being local databases located at individual facilities and connected directly to fraternization database 210, it should also be understood that these databases could, like inmate database 202, also be embodied as a central warehouse and connected to a server to download data as described above.

The fraternization database 210 is updated with the information it has received from the FTP client 208 as well as the information received from CNS database 225 and employee database 220. In addition, the fraternization database 210 obtains and stores Customer Detail Records or Call Detail Records (CDRs) for inmates from the DOC facilities covered by the system from one or more CDR databases 211 and attempts to determine whether there are correlations between the data. Some of the correlations may be determined automatically.

In order to keep the database current, the DOCs will send updates to the fraternization database to the communications provider on a regular basis, e.g., a DOC can upload the data file to an FTP server each day. The communications provider will then download the data file and use it to keep the fraternization database current. The present invention also provides for data transport of the fraternization data files. Data transport mechanisms are platform-independent. Examples of some of the mechanisms used would be FTP, SMTP, HTTP. Other transport mechanisms may be used depending on the systems in use at the DOCs.

An exemplary embodiment of the present invention includes a secure web based interface that may be accessed through, for example, a private frame relay network or other secure network, that links one or more central systems to end user locations, typically department of corrections (DOC) facilities, prisons or other law enforcement investigative facilities. The secure web based interface requests a user name and password for access.

An exemplary embodiment of the present invention includes a search engine that uses input from the user (described below in more detail) and searches the fraternization database 210 that includes historical CDRs in a telephone service provider's data warehouse. The fraternization database 210 also (as discussed above) includes data from the inmate database 202, DOC employee database 220 and the CNS database 225. If the search parameters in the query input by the user are matched by data in the fraternization database, then the search engine will return the results in, for example, a spreadsheet format such as Microsoft® Excel®. The search can return any correlations between inmate telephone activity and known employee telephone numbers.

The user can have, for example, an ICON on the desktop of a workstation. The user will click on the ICON in order to access the present invention. The user can input his/her user name and password for access. Once in the present invention, the user can input known information into the data search fields and research correlations between inmates and employees on a large scale.

Operation of Exemplary Embodiment

A fraternization database application running on the web server 212 retrieves information from the fraternization database 210 based on user input from, for example, a query module, on a remote user workstation 216. The remote user workstation 216 communicates with the web server 212 over a network 214, such as a private internet or frame relay network, which may be the same or a different network as the network 206.

In one example, an investigator will receive intelligence about the possibility of an inmate and an employee fraternizing. Such information may include a tip from an informant, information obtained from monitoring a phone call, inmate mail, or other intelligence sources. The information may be specific to a particular inmate or may be general and involve as yet unspecified inmate with an employee that is under suspicion.

Additionally, for example, queries can be automated and based on, for example, a profile, where for example, inmates with known predispositions to fraternizing can be monitored more closely than other inmates.

As discussed briefly above, an exemplary embodiment of the present invention implements security for authentication and authorization. This insures that only registered users with authentic username/password combinations can access the system. Further, through a multi-tiered authorization scheme, a specific process or person may only access or modify data that he has been authorized to process. For example, a user from a Department of Corrections facility located in Ohio may not, unless authorized, view and/or modify fraternization information from a Department of Corrections facility located in Florida.

Login Screen

The user interface begins with a login screen (not shown) where the user enters a username and a password. The username and password are used to authenticate the user and to set the access level to view fraternization information.

Search Screen

Figure 3:
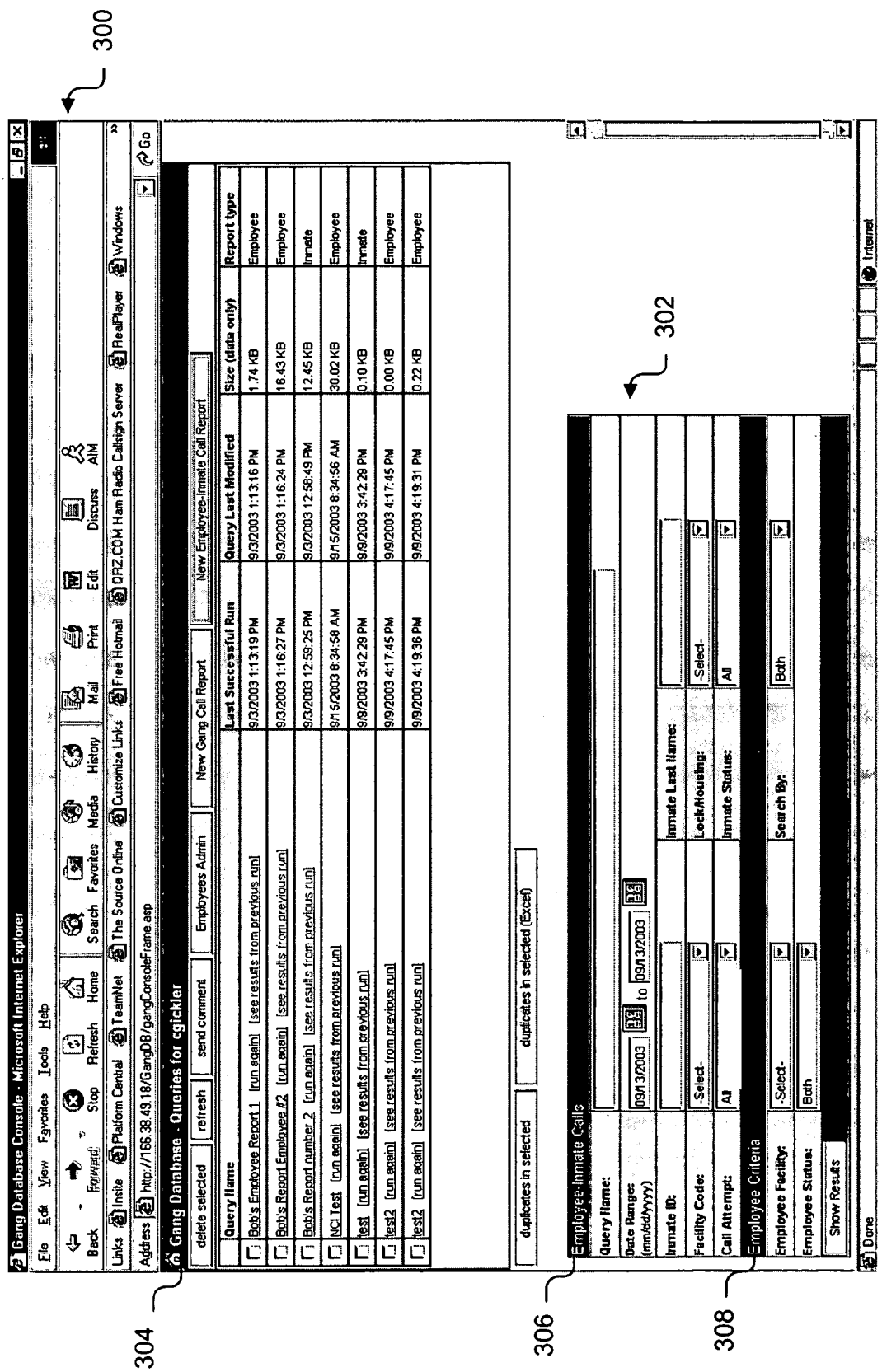
FIG. 3 is an exemplary user interface for displaying and manipulating search parameters.

The login screen leads to a user search screen. FIG. 3 depicts an exemplary user search screen 300 in accordance with the present invention. The user search screen 300 includes two sections: a query criteria section 302 to enter search parameters to filter the query, and a search result section 304 to display the query results. The query criteria section further includes two subsections: an employee-inmate call section 306 and an employee criteria section 308. Various search parameters may be entered in these sections in order to collect associated records that match the parameters specified. Each individual query can be given a name. That name is saved with the individual query can be used to later used to view the results of the query, for example, from the list of queries in the search result section 304.

Representative search parameters are described below. The search parameters may be used alone or in conjunction with other search parameters:

Date Range—Queries may be limited to records within a certain date range such as calls made during the specified date range.

Facility Code—Show all inmates from a particular facility.

Inmate ID—Show all calls made by a particular inmate.

Last Name—Show all calls made by inmates with a particular last name.

Lock/HU—Show all inmates that belong to a particular Lock/Housing unit.

Call Attempt—Show completed/non-completed/all calls.

Inmate Status—Show inmates by status.

Employee Facility—Show calls made to employees of a particular facility.

Employee Status—Show active/deactivated/both employees.

Search By—Search either by employee facility, employee status or both.

A representative search result, listed in search result section 304, with the Query name listed along with other information regarding the query. For example, with each query, a time/date stamp is provided that indicates the last successful run of the query, as well as when the query was last modified. Other information such as the size of the data obtained and the type of report (employee or inmate) was generated. To begin the search, a "show results" button is activated.

For example, if a user performs a query with an employee's name as the only input, the system will retrieve all information associated with the employee in the employee database 220 to obtain relevant phone number information. Then the system will use this information to determine if any inmate has called the number associated with the employee. Also, this system also has the ability to run a query that will search on individual inmates from site A on all employees in the employee database. In another exemplary facet, the invention has the ability to run a query on employees identified as working at site A against all call records. Furthermore, with the many different search parameters disclosed above, searches can be narrowed by introducing such additional parameters as PIN, called number and whether the call was completed or not.

Figure 4:
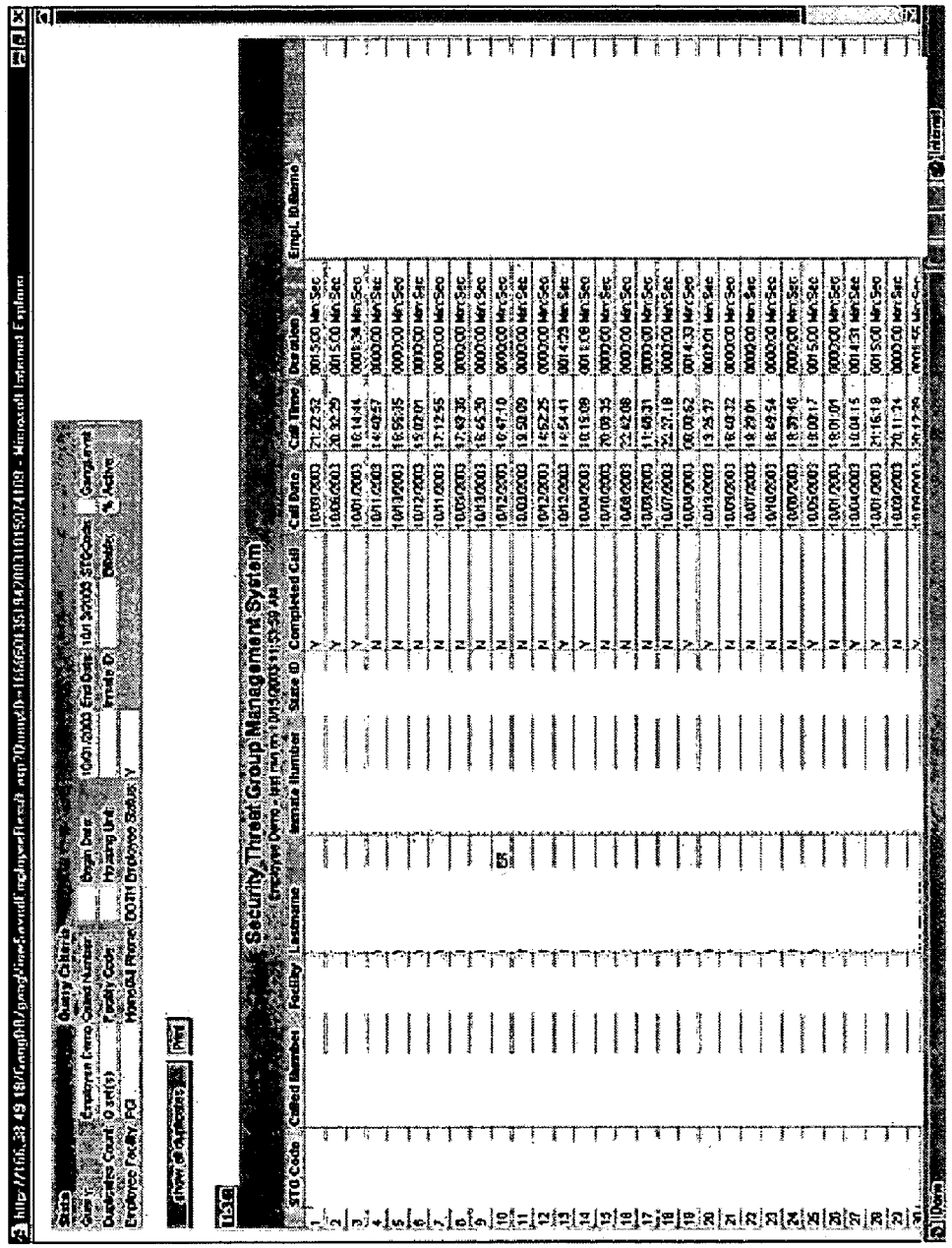
FIG. 4 is an exemplary user interface for displaying and manipulating search results.

Once a query has been generated, a user may wish to see more specific information relating to a query. By activating the "query name" (e.g., by use of a mouse) in the search result section 304 specific search results or fraternization instances from the query can be observed. FIG. 4 depicts an exemplary search results screen 400 where the search results are based upon a query. The system can provide search results of fraternization instances in, for example, a spreadsheet, such as Excel®, or in Windows/HTML as illustrated, having a number of fields or columns such as the following:

Security Threat Group (STG) Code—Shows a gang code, if applicable.

Called Number—An employee's called number

Facility—Facility where the call originated

Inmate Last Name—Inmate's last name.

Inmate Number or PIN—Inmate's identification number.

State ID—The Call Detail Record number for the call.

Completed Call (Y/N)—Data as to whether the call was completed.

Call Date—Date of call.

Call Time—Time of call.

Call Duration—Duration of call, if completed.

Employee Name—Name of employee to which the call was completed.

Each column has a sort capability so that once the search results have been retrieved, the user may sort the fraternization instances set by any one or more of the result fields. For example, results could be sorted by Security Threat Group codes and then further sorted by inmate State ID. The user may print the results if desired, store the result set for later use or electronically transmit the results to, for example, another investigator.

Figure 5A:
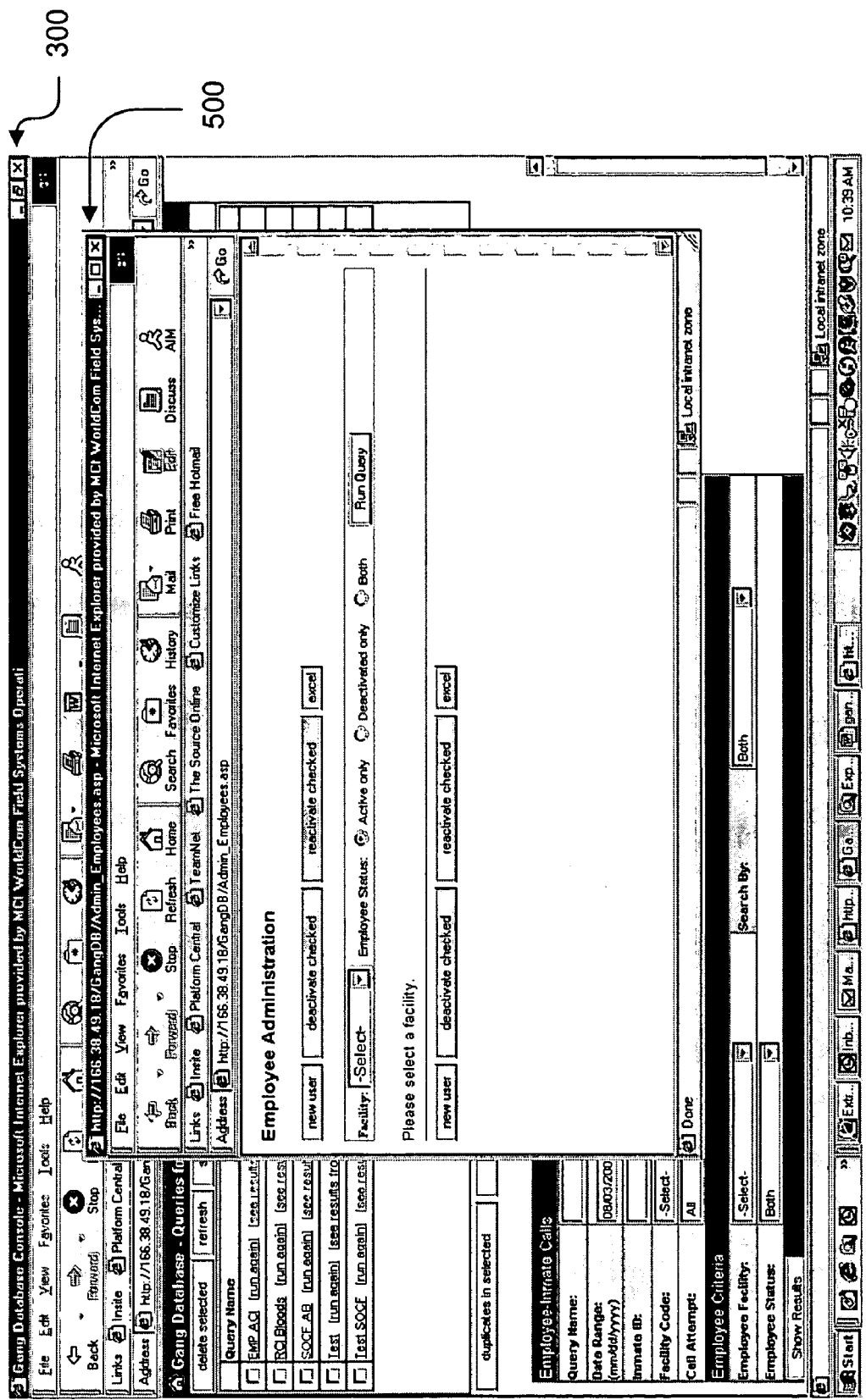
FIGS. 5A and 5B are exemplary user interfaces for displaying data entry and modification screens.

FIG. 5A depicts an exemplary employee database editing screen 500 to enter and/or edit the employee database 220. The editing screen 500 can be displayed by activating the "employees administration" button in the user search screen 300 illustrated in FIG. 3. Once a user is properly logged into the system as discussed above, a user can look up an employee and view, modify or change their status as well as their vital information (including the first and last name of the employee, home phone number, alternate phone number (e.g., cell phone number) and the location where the employee works). By activating the "new user" button, a new employee can be added into the database.

Figure 5B:
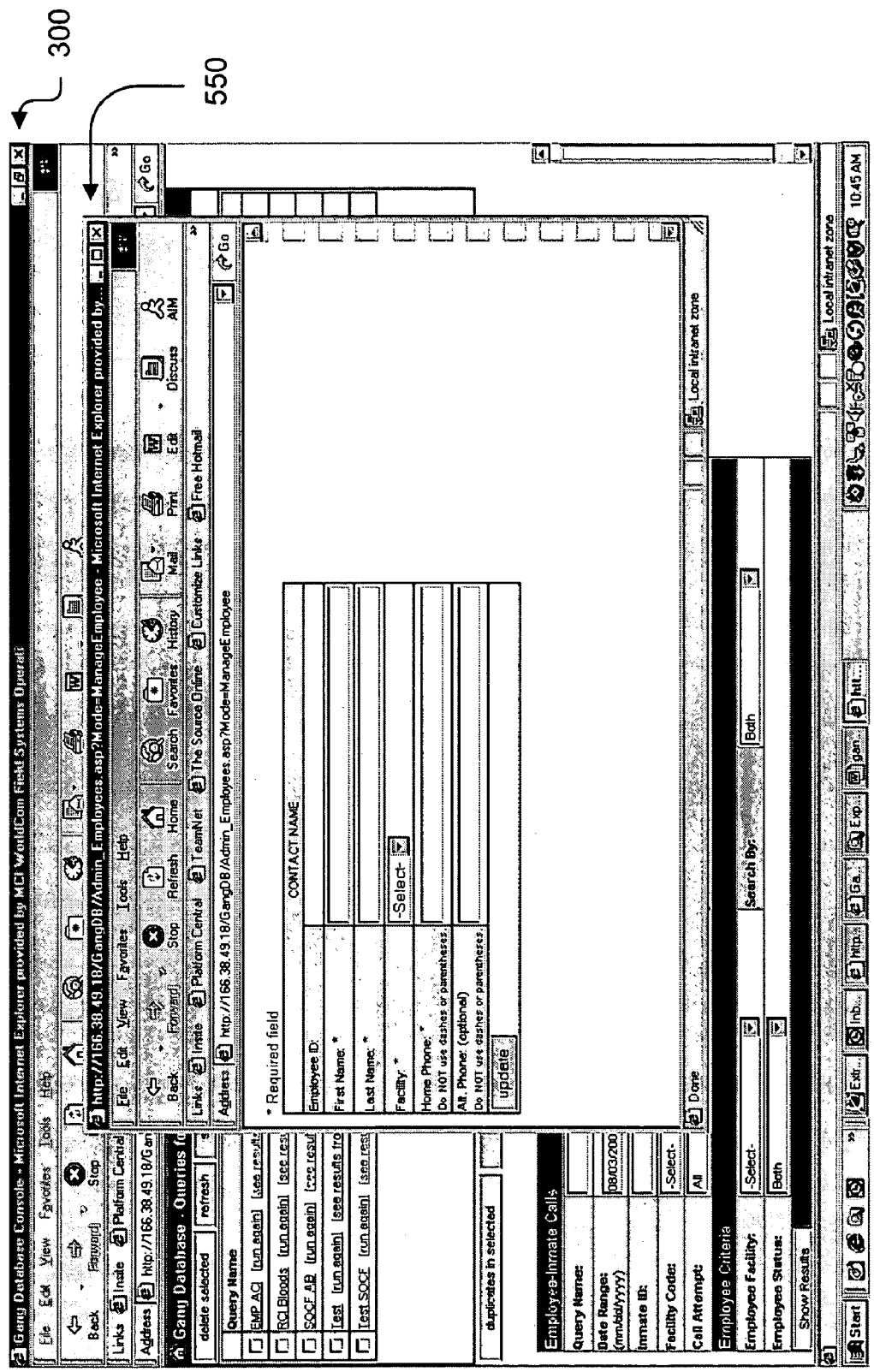

If the "new user" button is activated, data entry screen 550, illustrated in FIG. 5B, is displayed for the user. At that point, the a new employee can be added to the employee database by properly entering the data the first and last name of the employee, home phone number, alternate phone number (e.g., cell phone number) and the location where the employee works.

Figure 6:
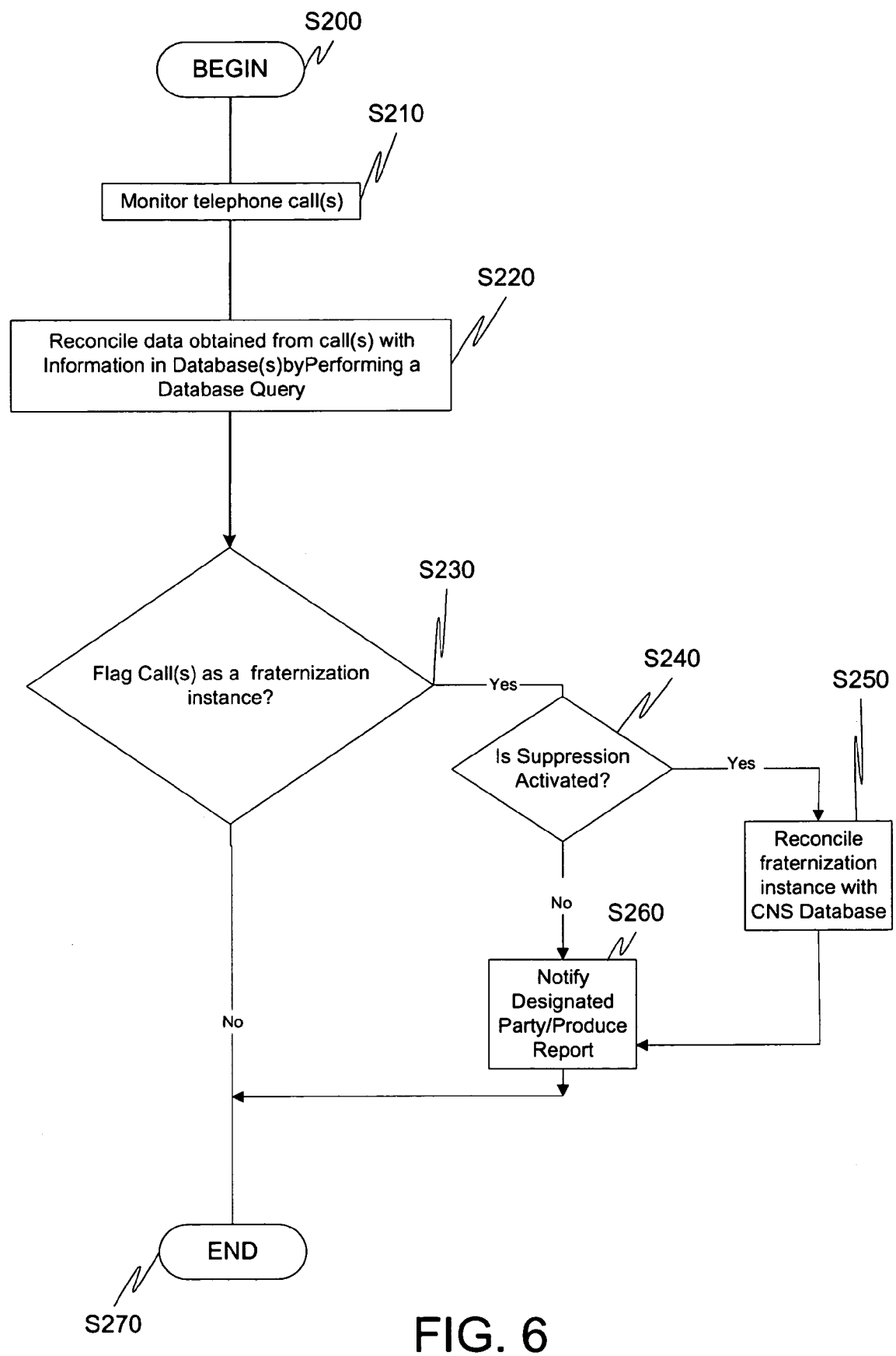
FIG. 6 is a flowchart illustrating an exemplary method for reconciling communications information with employee information.

FIG. 6 illustrates an exemplary method of discovering fraternization based on telephone calls, according to an exemplary embodiment of this invention. However, as discussed above, it should be understood that the present invention should not be limited to monitoring telephone calls, and that discovering fraternization could also be performed by monitoring any type of electronic communication including, but not limited to telephone calls, e-mail, instant messaging, electronic chat, paging or the like.

In particular, control begins in step S200 and continues to step S210. In step S210, one or more telephone calls are monitored. Next, in step S220, the personnel utilizing the system can create a query (either manually or automatically) in order to reconcile the call record information and data from the fraternization database. A query is run of the call record information to determine whether any specified search parameters (information relating to the employee and/or inmate) in the query has been determined to be resident in the call record information.

In step S230, based upon the query performed in step S220, all call records which match against specified parameters of the employee information and inmate information are flagged as a possible fraternization instance. If any of the telephone calls are identified as a fraternization instance, control continues to step S240. Otherwise, control jumps to step S260 where the control sequence ends.

In step S240, a determination is made as to whether a call number suppression feature has been activated. If call suppression has been activated then in step S250 potential fraternization instances determined in steps S220 and S230 are reconciled with data from the CNS database 225. Any numbers that match the numbers in the CNS database can then be suppressed from being identified as a possible fraternization instance. If call suppression is not activated, in step S240, for example, then a designated party is notified of any potential fraternization instances, and a report is generated. If call suppression is activated, then any suppressed numbers are not represented as an fraternization instance. This can be represented in multiple manners. For example, if a called number is located in the CNS database 225, record of the call can be omitted from any report (discussed above). Alternatively, the record and possible fraternization instance even is suppressed could be displayed and itemized in the report but have a special notation (e.g., color code) that would indicate that the number was located in the suppression database. Control then continues to step S270 where the control sequence ends. The results of this query can then, for example, be exported in a report in step S260. Additionally, the report can be reviewed at this time or saved or sent to an external device for printing.

As illustrated in the figures, the present invention can be implemented either on a single programmed general purpose computer, a separate programmed general propose computer, or a combination thereof. However, the present invention can also be implemented on a special purpose computer, a programmed microprocessor or microcontroller and peripheral integrated circuit element, an ASIC, or other integrated circuit, a digital signal processor, a hard-wired electronic or logic circuit, such as discrete element circuit, a programmable logic device, such as a PLD, PLA, FPGA, PAL or the like. In general, any device capable of implementing a state machine that is in turn capable of implementing the flowcharts illustrated herein can be used to implement the present invention.

Furthermore, the disclosed method may be readily implemented in software using an object or object-oriented software development environment that provides source code that can be used on a variety of computer, server, or workstation hardware platforms. Alternatively, the present invention may be implemented partially or fully in hardware using standard logic circuits or VLSI design. Whether software or hardware is used to implement the systems in accordance with this invention is dependent on the speed and/or efficiency requirements of the system, the particular function, and the particular software or hardware systems or microprocessor or microcomputer and telecommunications systems being utilized. The present invention however, can be readily implemented in hardware and/or software using any know or later developed systems or structures, devices and/or software by those of ordinary skill in the applicable art from the functional description provided herein, and with a general basic knowledge of the computer and telecommunications arts.

Moreover, the disclosed methods may be readily implemented as software executed on a programmed general purpose computer, a special purpose computer, a microprocessor, or the like. In these instances, the methods and systems of this invention can be implemented as a program embedded in a telecommunications system, such as JAVA® or CGI script, as a resource residing on a server or graphics workstation, as a routine embedded on a dedicated fraternization discovery system, or the like. The present invention can also be implemented by physically incorporating the system into a software and/or hardware system such as the hardware and software system of a server and associated interface device.

While this invention has been described in conjunction with a number of illustrative embodiments, it is evident that many alternatives, modifications, and variations would be or are apparent to those of ordinary skill in the applicable arts. Accordingly, the disclosure is intended to embrace all such alternatives, modifications, equivalents and variations that are within in the spirit and scope of this invention.

I claim:

1. A method of discovering inmate-employee fraternization comprising:
    monitoring a plurality of inmate communications;
    comparing the plurality of monitored inmate communications to information relating to inmates and employees located in a database;
    determining, based at least on the results of the comparing, if one or more of the plurality of communications indicate that an employee and inmate are fraternizing; and
    performing a predetermined action if one of the plurality of communications indicates that the employee and inmate are fraternizing.

2. The method of claim 1, wherein the predetermined action is at least one of generating a report or sending a notification to at least one entity.

3. The method of claim 2, further comprising:
    comparing data associated with the communications determined as indicating that an employee and inmate are fraternizing, to data in a suppression database.

4. The method of claim 3, wherein the report highlights or omits any communications in which its associated data and the data in the suppression database match.

5. The method of claim 1, wherein the plurality of communications are at least one of electronic messages, instant messages or one or more telephone calls.

6. The method of claim 1, wherein the plurality of communications can be monitored at least one of locally, nationally or internationally.

7. The method of claim 1, wherein monitoring a plurality of inmate communications includes:
    collecting at least one of a called number, time and date information, sender information, recipient information, location information, called identification information or inmate identification.

8. The method of claim 1, further comprising:
    querying a database of logged monitored communications to determine potential fraternization between an employee and an inmate.

9. A system that discovers employee-inmate fraternization comprising:
    a monitoring module that monitors a plurality of communications from inmates;
    a comparison module that compares the plurality of monitored communications to information relating to inmates and employees in a database;
    a determination module that determines, based at least on the results of the comparison, if one or more of the plurality of communications indicate that an employee and an inmate are fraternizing; and
    a result module that forwards instructions to perform a predetermined action if one of the plurality of communications indicates that the employee and the inmate are fraternizing.

10. The system of claim 9, wherein the result module at least one of generates a report or sends a notification to at least one entity.

11. The system of claim 10, further comprising:
a second comparison module in which data associated with the communications determined as indicating that an employee and inmate are fraternizing, is compared to data in a suppression database.

12. The system of claim 11, wherein the report highlights or omits any communications in which its associated data and the data in the suppression database match.

13. The system of claim 9, wherein the plurality of communications are at least one of electronic messages, instant messages or one or more telephone calls.

14. The system of claim 9, wherein the plurality of communications can be monitored at least one of locally, nationally or internationally.

15. The system of claim 9, wherein the monitoring module collects at least one of a called number, a calling number, conference call information, time and date information, sender information, recipient information, location information, called identification information, or inmate identification.

16. The system of claim 9, further comprising a query module configured to query a database of logged monitored communications to determine potential fraternization between the inmate and the employee.

17. An information storage media comprising information configured to discover inmate-employee fraternization comprising:
information that monitors a plurality of communications from inmates;
information that compares the plurality of monitored communications to information relating to inmates and employees in a database;
information that determines, based at least on the results of the comparing, if one or more of the plurality of communications indicates that an inmate and an employee are fraternizing; and
information that performs a predetermined action if one of the plurality of communications indicates that an inmate and an employee are fraternizing.

18. A device for discovering inmate-employee fraternization comprising:
means for monitoring a plurality of inmate communications;
means for comparing the plurality of monitored inmate communications to information relating to inmates and employees located in a database;
means for determining, based at least on the results of the comparing, if one or more of the plurality of communications indicate that an employee and inmate are fraternizing; and
means for performing a predetermined action if one of the plurality of communications indicates that the employee and inmate are fraternizing.

19. The device of claim 18, further comprising:
means for comparing data associated with the communications determined as indicating that an employee and inmate are fraternizing, to data in a suppression database.

20. The device of claim 19, wherein the predetermined action is at least one of generating a report or sending a notification to at least one entity.

21. The device of claim 20, wherein the report highlights or omits any communications in which its associated data and the data in the suppression database match.

22. The device of claim 18, wherein the plurality of communications are at least one of electronic messages, instant messages or one or more telephone calls.

23. A method of discovering inmate-employee fraternization comprising:
receiving a communication from an inmate;
comparing the communication to information relating to inmates and employees located in a database;
determining, based at least on the results of the comparing, whether the communication indicates that an employee and inmate are fraternizing; and
performing a predetermined action if the communication indicates that the employee and inmate are fraternizing.

24. The device of claim 23, further comprising:
means for comparing data associated with the communication determined as indicating that an employee and inmate are fraternizing, to data in a suppression database.

25. The device of claim 24, wherein the predetermined action is at least one of generating a report or sending a notification to at least one entity.

26. The device of claim 25, wherein the report highlights or omits the communication if its associated data and the data in the suppression database match.

27. The device of claim 23, wherein the communication is at least one of an electronic message, instant message or a telephone call.

* * * * *